(12) United States Patent
Rao

(10) Patent No.: US 8,023,439 B2
(45) Date of Patent: Sep. 20, 2011

(54) MULTICAST FLOW DISTRIBUTION

(75) Inventor: Roshan M Rao, Acton, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 829 days.

(21) Appl. No.: 11/561,526

(22) Filed: Nov. 20, 2006

(65) Prior Publication Data

US 2008/0117842 A1  May 22, 2008

(51) Int. Cl.
*H04B 7/00* (2006.01)
(52) U.S. Cl. ......... 370/310; 370/312; 370/389; 370/219
(58) Field of Classification Search ............... 370/310, 370/312, 389, 219
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,489,696 B2 * | 2/2009 | Longoni et al. .............. 370/401 |
| 7,558,356 B2 | 7/2009 | Pollman et al. |
| 7,558,588 B2 | 7/2009 | To et al. |
| 7,603,127 B2 | 10/2009 | Chung et al. |
| 2002/0196749 A1 | 12/2002 | Eyuboglu et al. |
| 2003/0100311 A1 | 5/2003 | Chung et al. |
| 2004/0095881 A1* | 5/2004 | Borella et al. .............. 370/219 |
| 2005/0213555 A1 | 9/2005 | Eyuboglu et al. |
| 2005/0221825 A1* | 10/2005 | Osugi .......................... 455/436 |
| 2005/0243749 A1 | 11/2005 | Mehrabanzad et al. |
| 2005/0245279 A1 | 11/2005 | Mehrabanzad et al. |
| 2006/0058056 A1* | 3/2006 | Das et al. ..................... 455/524 |
| 2006/0067422 A1 | 3/2006 | Chung |
| 2006/0067451 A1 | 3/2006 | Pollman et al. |
| 2006/0126509 A1 | 6/2006 | Abi-Nassif et al. |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |

(Continued)

FOREIGN PATENT DOCUMENTS

GB  2452688  3/2009

OTHER PUBLICATIONS

3rd Generation Partnership Project 2 "3GPP2", "cdma2000 High Rate Packet Data Interface Specification", C.S0024, version 4, Oct. 25, 2002 (548 pages).

(Continued)

*Primary Examiner* — Barry W Taylor
(74) *Attorney, Agent, or Firm* — Fish & Richardson P.C.

(57) ABSTRACT

In addition to other aspects disclosed, in response to being informed by a controller of a flow for transmission to at least one access terminal in a wireless network, a master base station router assigns the flow to one of a plurality of slave base station routers to process the flow for transmission to the access terminal.

57 Claims, 6 Drawing Sheets

U.S. PATENT DOCUMENTS

| | | | |
|---|---|---|---|
| 2007/0058628 A1 | 3/2007 | Palnati et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0223494 A1* | 9/2007 | Hyyrynen et al. | 370/395.54 |
| 2007/0230419 A1 | 10/2007 | Raman et al. | |
| 2007/0238442 A1 | 10/2007 | Mate et al. | |
| 2007/0238476 A1 | 10/2007 | Sharma et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0080408 A1* | 4/2008 | Gao | 370/312 |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'Ng et al. | |
| 2009/0170520 A1 | 7/2009 | Jones | |
| 2009/0170547 A1 | 7/2009 | Raghothaman et al. | |
| 2009/0172169 A1 | 7/2009 | Ramaswamy et al. | |
| 2009/0172397 A1 | 7/2009 | Kim | |
| 2009/0186626 A1 | 7/2009 | Raghothaman et al. | |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024-A, version 1, Mar. 2004 (1083 pages).

* cited by examiner

MULTICAST FLOW DISTRIBUTION

BACKGROUND

This description relates to distributing multicast flows.

Multimedia content may be passed and shared among devices such as cellular phones and computing devices (also referred to as Access Terminals or ATs).

This multimedia content may be implemented to comply with one or more standards such the EV-DO Rev A standard (also written as 1xEV-DO Rev A or 1x Evolution-Data Optimized Revision A), which is herein incorporated by reference. EV-DO Rev A is included in a family of standards that are promoted by the Third Generation Partnership Project 2 (3GPP2), a collaborative Third Generation (3G) telecommunications specification-setting project associated with the development of the next generation Code Division Multiple Access (CDMA) wireless communications.

The 1xEV-DO protocol is an EVolution of the 1xRTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, which is also incorporated herein by reference.

When exchanging multimedia content, a series of setup-messages are sent between a user's AT and structures included in a Radio Access Network (RAN). These structures include Radio Nodes (RNs), Radio Network Controllers (RNCs) and Packet Data Serving Nodes (PDSNs), which act as a link between the ATs and content servers (and controllers) that provide the multimedia content.

In some RANs, services provided by RN, RNCs and PDSNs are integrated into a single unit referred to as a Base Station Router (BSR) that reduces space needs and power consumption. However, as multimedia content traffic increases, BSRs (similar to individual RNCs and RNs) are susceptible to overload conditions and potential failure.

SUMMARY

In general, in some aspects of the invention, in response to being informed by a controller of a flow for transmission to at least one access terminal in a wireless network, a master base station router assigns the flow to one of a group of slave base station routers to process the flow for transmission to the access terminal. In some arrangements, the controller may be aware or unaware of the slave base station routers. A content provider may provide a flow such as a multicast flow or a unicast flow to the assigned slave base station router. The flow may conform to a published standard such as a standard associated with a Broadcast and Multicast Services (BCMCS) flow.

The master base station router may operate as a radio node, a radio node controller, a packet data serving node or a combination thereof. To assign the flow, the master base station router may determine the processing capacity of each slave base station router. Each slave base station router may send information representative of their processing capacity to the master base station router. This information may be sent in a periodic manner or may be sent based upon a trigger event such as a processing capacity threshold being exceeded.

In response to monitoring a message sent to the master base station router from a backup base station router, flow operations may be transferred from the master base station router to the backup base station router. Operations may also be transferred to the backup base station router if a message acknowledge response is not sent from the master base station router. The backup base station router may send message to other components such as each of the slave base station routers as a flow operations transfer alert. This message may indicate the transfer of operations from the master base station router to the backup base station router. Rather than the master base station router, in response to a failure detection, flow operations may be transferred from a slave base station router to a backup base station router.

In some aspects of the invention, a system includes a controller that initiates a transmission of a flow to at least one access terminal in a wireless network. The system also includes a master base station router that assigns processing of the flow and a group of slave base station routers. One more of slave routers is assigned by the master base station router to process the flow for transmission to the access terminal. In some arrangements, the controller may be aware or unaware of the slave base station routers. A content provider may provide a flow such as a multicast flow or a unicast flow to the assigned slave base station router. The flow may conform to a published standard such as a standard associated with a Broadcast and Multicast Services (BCMCS) flow.

The master base station router may operate as a radio node, a radio node controller, a packet data serving node or a combination thereof. To assign the flow, the master base station router may determine the processing capacity of each slave base station router. Each slave base station router may send information representative of their process capacity to the master base station router. This information may be sent in a periodic manner or may be sent based upon a trigger event such as a processing capacity threshold being.

In response to monitoring a message sent to the master base station router from a backup base station router, flow operations may be transferred from the master base station router to the backup base station router. Operations may also be transferred to the backup base station router if a message acknowledge response is not sent from the master base station router. The backup base station router may send messages to other components such as each of the slave base station routers as a flow operations transfer alert. This message may indicate the transfer of operations from the master base station router to the backup base station router. Rather than the master base station router, in response to a failure detection, flow operations may be transferred from a slave base station router to a backup base station router.

In some aspects of the invention, a medium bears instructions to cause a machine to, in response to being informed by a controller of a flow for transmission to at least one access terminal in a wireless network, assign (by a master base station router) the flow to one of a group of slave base station routers to process the flow for transmission to the access terminal. In some arrangements, the controller may be aware or unaware of the slave base station routers. A content provider may provide a flow such as a multicast flow or a unicast flow to the assigned slave router. The flow may conform to a published standard such as a standard associated with a Broadcast and Multicast Services (BCMCS) flow.

The master base station router may operate as a radio node, a radio node controller, a packet data serving node or a combination thereof. To assign the flow, the master router may determine the processing capacity of each slave base station router. Each slave base station router may send information representative of their processing capacity to the master base station router. This information may be sent in a periodic manner or may be sent based upon a trigger event such as a processing capacity threshold being exceeded.

In response to monitoring a message sent to the master router from a backup base station router, flow operations may be transferred from the master base station router to the backup base station router. Operations may also be transferred to the backup base station router if a message acknowledge response is not sent from the master base station router. The backup base station router may send messages to other components such as each of the slave base station routers as a flow operation transfer alert. This message may indicate the transfer of operations from the master base station router to the backup base station router. Rather than the master base station router, in response to a failure detection, flow operation may be transferred from a slave base station router to a backup base station router.

Among the advantages of the techniques described here are one or more of the following.

Because flow processing is distributed across a group of base station routers, the probability of router overload and failure is reduced. Furthermore, by incorporating backup base station routers, the probability of system failure is further reduced.

Other features and advantages will be apparent from the description and the claims.

DESCRIPTION

Figure 1:
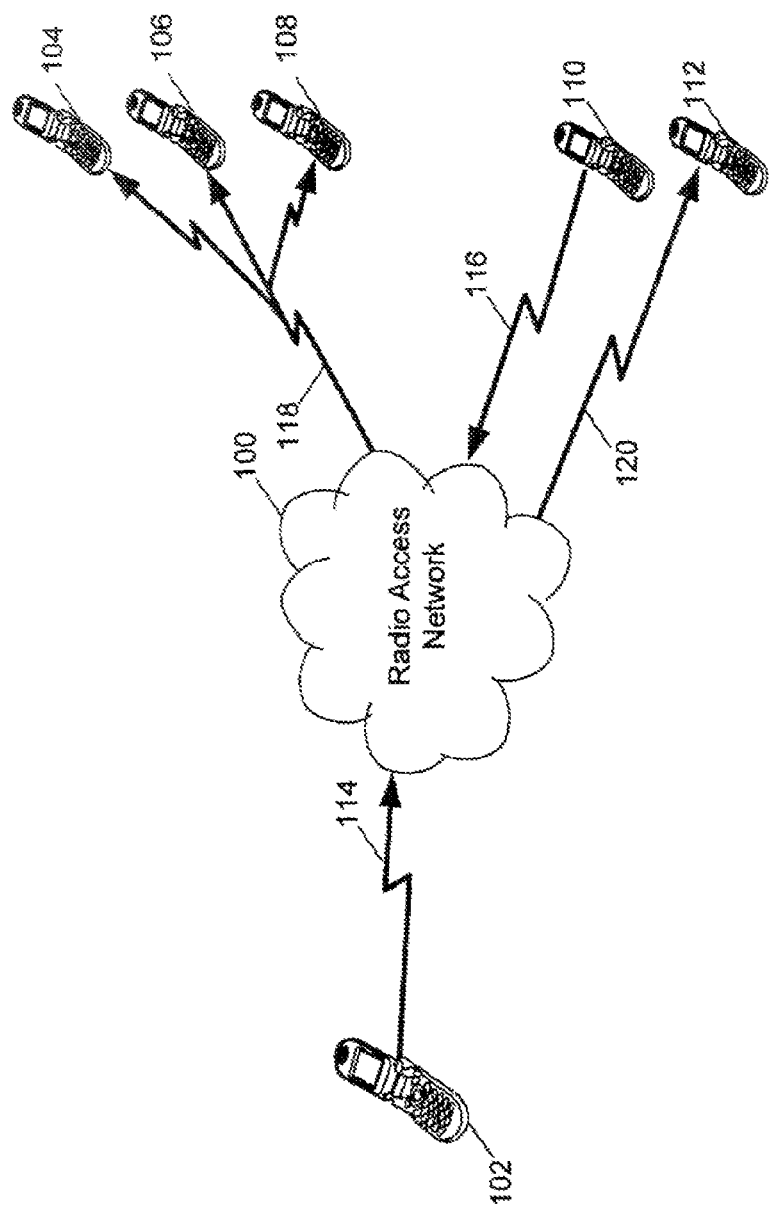
FIG. 1 is a diagram of a Radio Access Network.

Referring to FIG. 1, in some embodiments, a cellular phone user may wish to provide multimedia content (e.g., audio, video, data, etc.) to one or multiple other cellular phone (or other type of AT) users. A session is established by the user's cellular phone with the one or multiple target cellular phones for content transfer. Similarly, one or more of the recipients may respond by providing multimedia content to the cellular phone user who initiated the session or to other cellular phone users. To provide wireless trafficking of the multimedia content, a Radio Access Network (RAN) 100 is used to establish wireless links with each respective cellular phone (or other type of AT).

For example, a cellular phone 102 may be used to share multimedia content with cellular phones 104, 106 and 108. Similarly, cellular phone 110 may be used to share content with a single target cellular phone 112. Cellular phones 102 and 110 (also referred to as the caller ATs), respectively send multimedia content to RAN 100 for delivery to the appropriate one or more target mobile phones (also referred to as target ATs). As can be imagined, while cellular phones are linked via the RAN 100, other types of ATs may be implemented such as personal digital assistants (PDAs), computer systems (e.g., a laptop computer) with wireless modules, or other type of device that supports a protocol such as the 1×EV-DO protocol.

For illustration, a wireless link 114 is established to provide multimedia content from the AT 102 to the RAN 100. Similarly, a wireless link 116 is established to provide multimedia content from the AT 110 to the RAN 100. To provide the multimedia content from AT 102 to multiple target ATs, a multicast flow is placed on a wireless link 118 that is established by the RAN 100 and is accessible by the ATs 104, 106, 108. To provide multimedia content from AT 110 to the one target AT 112, a unicast flow is placed on a wireless link 120 that is received by AT 112. Generally, the term "unicast" refers to any communication technique that enables data to be sent in a point-to-point manner using a dedicated transmission stream. The term "multicast" refers to any communication technique that enables data to be sent in a point-to-multipoint manner to a select group of recipients using a common transmission stream.

Examples of multicast flows that may be established by the RAN 100 include a 3GPP2 Broadcast and Multicast Services (BCMCS) flow. In general, BCMCS is a multicast flow for Code Division Multiple Access (CDMA) (e.g., CDMA2000) networks that implement a flexible common radio channel suitable for point-to-multipoint and broadcast traffic. As with other types of multicast flows, BCMCS provides the benefit of multicast and broadcast in which many ATs can access a common channel. By receiving data from a common channel, data sets do not need to be replicated for transmission over multiple unicast flows (respectively assigned to individual ATs). Compared to a unicast flow, a multicast flow provides more efficient bandwidth management and access flexibility.

Figure 2:
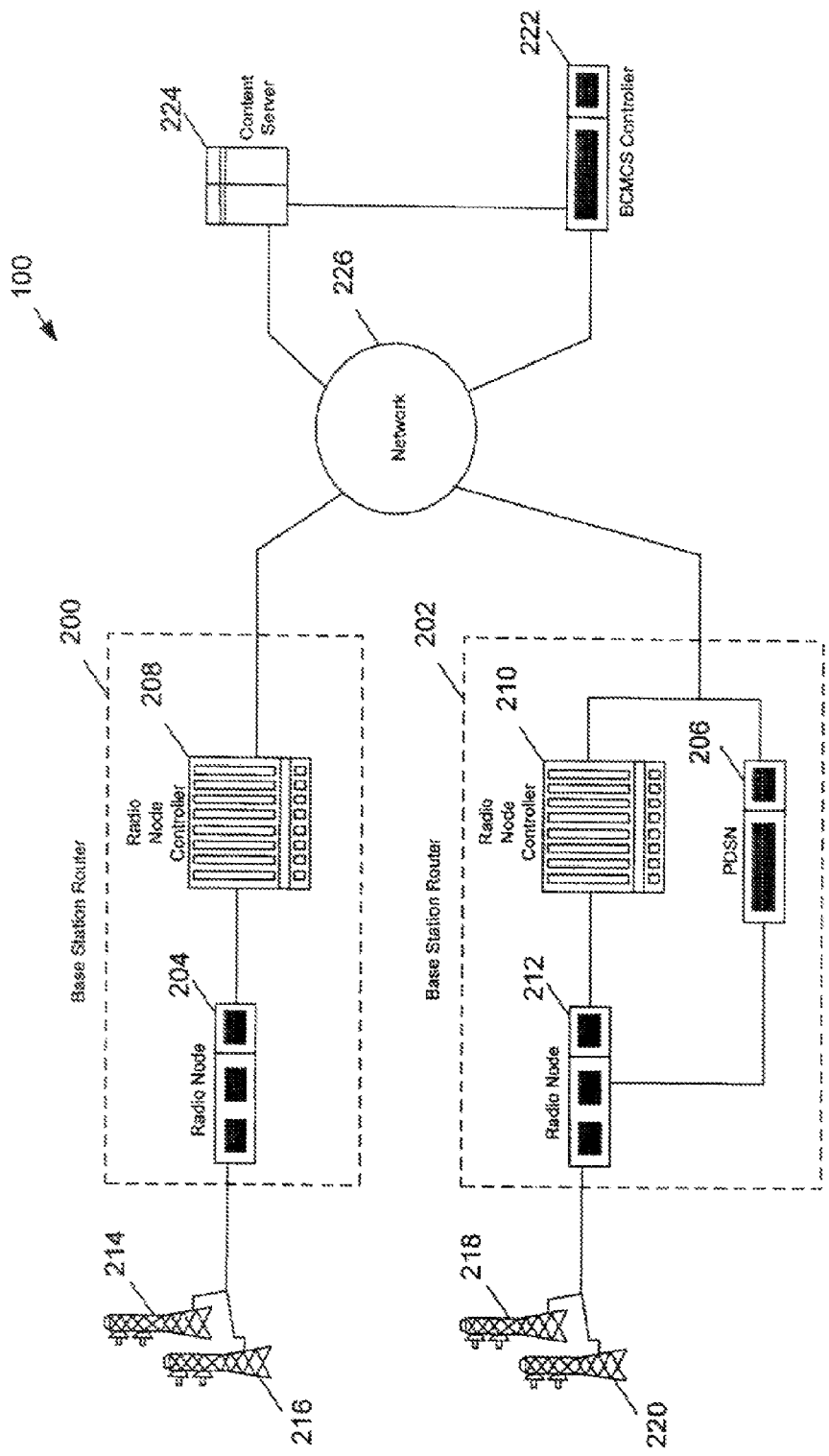
FIG. 2 is a block diagram of components included in a Radio Access Network.

Referring to FIG. 2, an exemplary implementation of the RAN 100 is presented that supports providing multimedia content over multicast flows and unicast flows. Conventional RANs typically include RNs and RNCs, in which the TNCs execute processes for establishing multicast flows. In the implementation of the RAN 100, the functionalities of the RNs and the RNCs are respectively integrated into single units referred to as Base Station Routers (BSR). In general, a BSR provides a wireless access point for ATs and communicates with the devices based upon a wireless standard (e.g., 1×EV-DO). For illustration, the RAN 100 includes a BSR 200 that respectively includes an RN 204 and an RNC 208. Along with RN and RNC services, in some arrangements, one or more of the BSRs may provide additional functionality. For example, a BSR may also include a packet data serving node (PDSN) for establishing unicast flows. The RAN 100 is also represented as including a BSR 202 that provides the functionality of a PDSN 206 along with services of an RNC 210 and an RN 212. While both of the BSRs 200, 202 include one respective RNC (i.e., RNC 208 and 210) and RN (e.g., RN 204 and 212), in some implementations, more RNCs and RNs may be included in a BSR. Furthermore, the RAN 100 may include more that two BSRs, for example, to provide coverage over more sectors. To establish wireless links within a sector for multicast flows and unicast flows, each of the BSRs 200, 202 are respectively connected to one or more antenna systems 214, 216, 218, 220 to transmit and receive wireless signals from ATs.

The RNC functionality (included in each BSR) communicates (e.g., over an Internet Protocol (IP) network referred to as a backhaul network) with the one (or more) associated RN. Each RN may serve multiple geographical areas (e.g., sectors) and communicate with ATs present within the sectors. In some arrangements, an RNC may include one or multiple system controller (SC) cards, of which, one or more may be active during particular time periods. The RNC may also include, e.g., four input/output (I/O) cards such as basic input/output (BIO) cards. The I/O cards may provide connectivity for numerous (e.g., eight) Radio Network Service Module (RNSM) cards, which may implement the 1×EV-DO functionality. However, in other implementations RNC functionality may be may be provided without using a multiple card functional structure (e.g., BIO, RNSM, SC, etc.).

The RAN 100 also includes a BCMCS Controller 222 that may be configured to arrange multicast flows of multimedia content. For example, BCMCS Controller 222 may be used to define program names along with start and end times associated with multicast flows. Bandwidth requirements, addressing information, header compression information, quality of service (QOS)/bit error rate levels, and RN geographical distribution headers may be defined by BCMCS controller 222 along with other parameters. Multicast flow processing such as compression and encryption techniques may be provided by BCMCS controller 222. The BCMCS controller 220 may also provide flow parameters to a content server 224, the BSRs 200, 202 and to other components of RAN 100. Other operations provided by BCMCS controller 200 may include assisting in the authentication of ATs along with providing the ATs with encryption and decryption data (e.g., encryption keys, etc.).

The BSRs 200 and 202 may establish pathways for unicast and multicast flows within the RAN 100 (e.g., assigning pathways for particular multicast flows, initiating broadcast channels at appropriate times, etc.) while the content server 224 may initiate and control content streaming to the BSRs and the time schedules. Additionally, BSRs 200, 202 may provide operations such as preparing content (e.g., attaching Point-to-Point Protocol (PPP) headers, attaching Frame Check Sequence (FCS) trailers, etc.) for transmission to one or more ATs. BSRs 200, 202 may assure that the multicast flows comply with protocols such as the Broadcast Framing Protocol, the Broadcast Security Protocol and the Broadcast MAC Protocol, for example. Furthermore, BSRs 200 and 202 may apply one or more error detecting techniques (e.g., Reed-Solomon Error-detection coding) to the multicast flows and manage the broadcast channels included in the flows.

At an appropriate time (e.g., defined by BCMCS controller 222), the content server 224 initiates content streaming to one or both of the BSRs 200 and 202 via a network 226 such as an Internet Protocol (IP) network. Upon receipt, the BSRs 200 and 202 may perform operations such as multicast framing (e.g., BCMCS framing), error-correction preparation (e.g., addition of error-correction bits, etc.), prior to sending the multicast flow to one or more appropriate antenna systems for transmission, e.g., over a Broadcast Channel. Similarly, BSR 202 may process unicast flows from the content server 224 for transmission. Along with broadcasting the multicast and unicast flow content, periodic overhead messages may be broadcasted over a channel (referred to as a Control Channel). The overhead messages may, for example, include information for granting one or more ATs access to particular types of data such as high-layer data packets.

The BCMCS controller 222 may also provide information to one or more ATs (via the network 226 and a BSR) that is associated with one or more multicast or unicast flows. For example, encryption keys, flow identification data (e.g., flowID data), address data (e.g., multicast address mappings information), compression data (e.g., header compression (ROHC) parameters), decryption data, etc.

By integrating the functionality of one or more RNCs and RNs (and PDSNs) in a single BSR, multicast services and unicast services are provided by a single system component. However, in providing these services, the processing performed by the BSR may become overloaded and thereby slow service execution. To reduce the probability of overload of a single BSR, processing may be distributed across multiple BSRs. Furthermore, one or more load balancing schemes may be implemented to improve flow processing. In addition to reducing component overload, by incorporating one or more layers of BSR redundancy, the probability of system failure due to one or more BSRs failing may be reduced.

Figure 3:
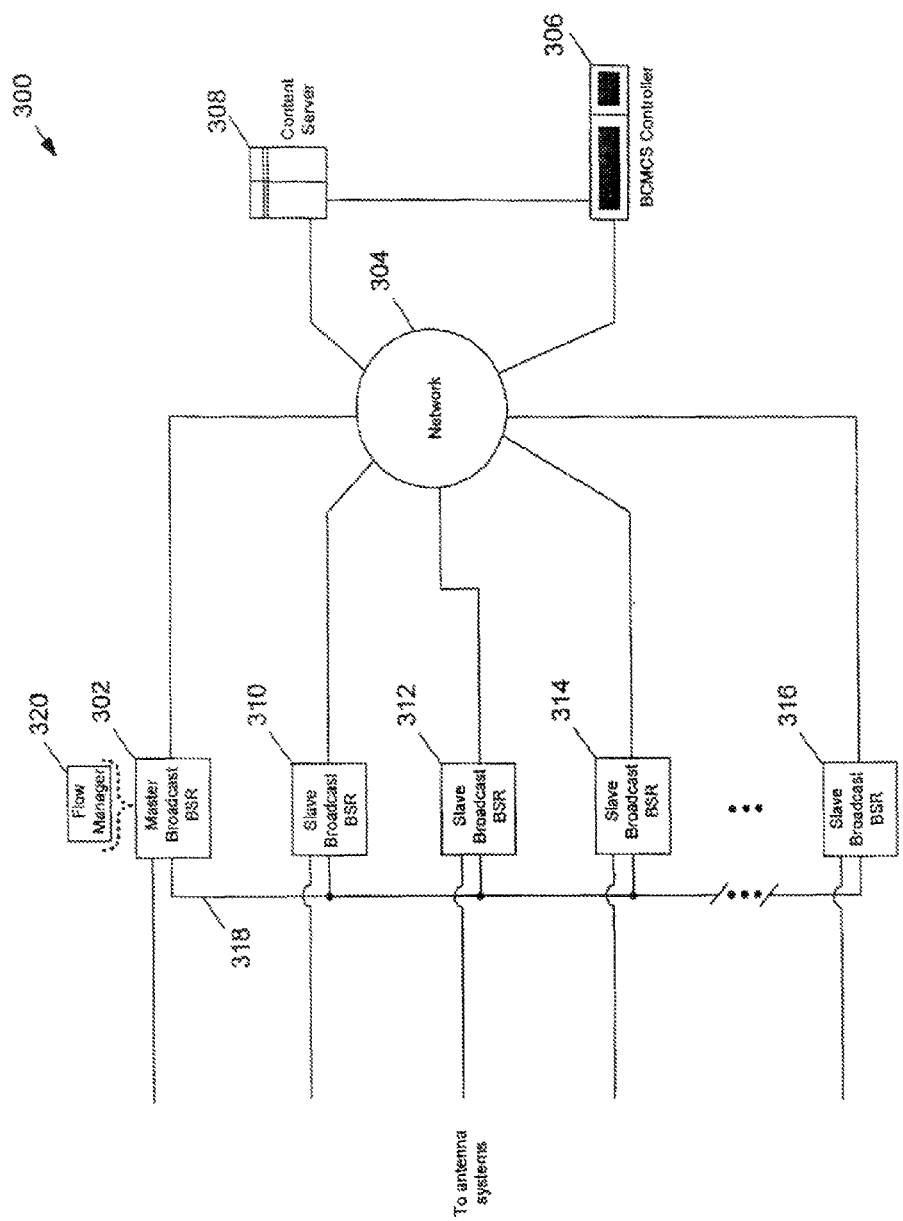
FIG. 3 is a block diagram of a Master Broadcast Base Station Router and Slave Broadcast Base Station Routers.

Referring to FIG. 3, an exemplary system 300 for distributing flow processing such as BCMCS flow processing is presented. The system 300, which may be incorporated into a RAN, includes multiple broadcast BSRs (BBSRs) to balance multicast and unicast flow traffic that might overload the processing capabilitites of a single BSR. A BBSR is a BSR that is capable of performing broadcast service node (BSN) processing for one or more BCMCS flows. Generally, a single BCMCS flow is provided by one BBSR and the flow is typically not shared among two or more BBSRs. However, shared processing of a single BCMCS flow may be distributed among multiple BBSRs in other implementations.

In this arrangement, the multiple BBSRs include a master BBSR 302 that is in communication with a network (e.g., an IP network) 304 that is connected to a BCMCS controller 306 and a content server 308. In this arrangement, the master BBSR 302 executes such operations as negotiating with the BCMCS controller 306 and distributing flow processing among a group of slave BBSRs 310, 312, 314, 316. The BCMCS controller 306 is unaware of the slave BBSRs present in the system 300 and may assume that the master BBSR 302 is directing operations to prepare the flows for transmission to one or more ATs.

The BSMCS controller 306 provides information such as multicast flow information (e.g., content description, destination information, source information, sector identifiers for local broadcasts, etc.) to the master BBSR 302 to prepare the flow for transmission. The master BBSR 302 also negotiates flow parameters (e.g., flow rates, start and end times, etc.) with the BCMCS controller 304 (e.g., by exchanging messages). Typically, once the flow parameters are set, the BCMCS controller 306 alerts the content server 308 that flows may be sent to the network 304 for transmission (via the BBSRs 302, 310, 312, 314, 316).

To balance the multicast processing load, the master BBSR 302 selects which slave BBSR is to be assigned one or more flows for processing in preparation for transmission. For example, the master BBSR 302 may track the capabilities of each slave BBSR along with their current and scheduled processing loads. From this information, the master BBSR 302 may select a particular slave BBSR to handle one or more flows. The master BBSR 302 may assign an address to the selected slave BBSR and notify the BCMCS controller 306 that the address is to receive a particular flow. The content server 308 is provided this address from the BCMCS controller 306 along with other flow parameters (e.g., flow rate, start time, end time, etc.).

to communicate with the group of slave BBSRs 310, 312, 314, 316, a connection 318 referred to as a backhaul connection connects the slaves to the master BBSR 302. Various signaling techniques may be used with the connection 318, for example, signals complying with protocols such as the Transmission Control Protocol (TCP) or an IP multicast may be implemented. Along with providing assignment information to the slave BBSRs, the master BBSR 302 may also receive status information (e.g., current capacity, current operations being executed, etc.) over the backhaul connection 318 from the slaves. With this information, the master BBSR 302 can track the current state of the slaves and project future flow processing assignments.

Since the controller 306 is not in communication with each individual slave BBSR 310-316, the master BBSR 302 controls the dispensing of multicast flow information to the slave BBSRs. To assign a flow to one of the slave BBSRs 310-316, the master BBSR 302 executes a Flow Manager 320. In some embodiments one or multiple processors may execute instructions to perform the operations of the Flow Manager 320. For example, one or more general processors (e.g., a microprocessor) and/or one or more specialized devices (e.g., an application specific integrated circuit (ASIC), etc.) may execute instructions. One or more of the processors may be implemented in a single integrated circuit as a monolithic structure of in a distributed structure. In some embodiments the instructions that are executed by the processors may reside in a memory (e.g., random access memory (RAM), read-only memory (ROM), static RAM (SRAM), etc.). The instruction may also be stored on one or more mass storage devices (e.g., magnetic, magneto-optical disks, or optical disks, etc.).

One or more of the operations associated with the Flow Manager 320 may be performed by one or more programmable processors (e.g., a microprocessor, an ASIC, etc.) executing a computer program. The execution of one or more computer programs may include operating on input data and generating output. The operations may also be performed by a processor implemented as special purpose logic circuitry (e.g., an FPGA (field programmable gate array), etc.).

Figure 4:
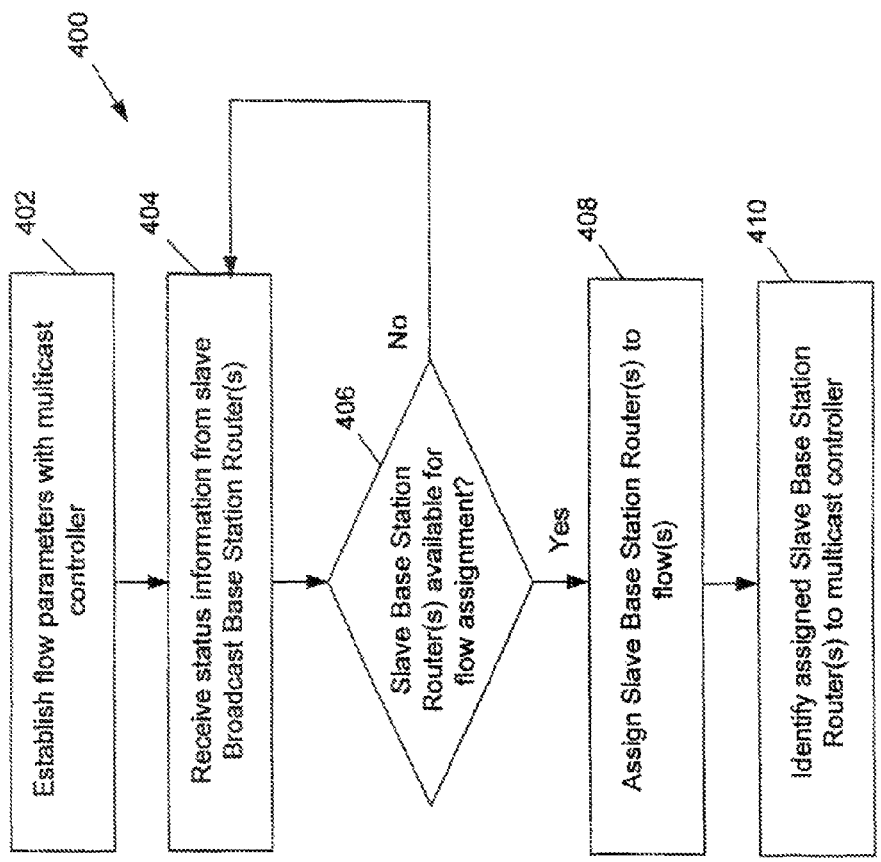
FIG. 4 is a flow chart of operations executed by a Flow Manager.

Referring to FIG. 4, a flowchart 400 that represents some of the operations of Flow Manager 320 is shown. As mentioned above, the Flow Manager 320 may be executed by the master BBSR 302, or executed by one or more other computation devices in communication with the master BBSR. Some operations may include establishing 402 flow parameters with a multicast controller (e.g., a BCMCS controller). Along with establishing parameters, the multicast controller may identify flows scheduled for transmission. Upon setting up the flow parameters, operations may include the master BBSR receiving 404 capability information from each of a group of slave BBSRs. Along with the current status of each slave, this information may include the processing capacity of each slave.

From this collected information, the master BBSR determines how the scheduled flow are to be assigned among the slave BBSRs and itself by using one or more balancing techniques so that none of the BBSRs are substantially overloaded with flow operations. Upon assignment, the master BBSR determines 406 if one or more of the slave BBSRs is available for their respective assignment. If one or more of the slave BBSRs are not available (e.g., inoperable), the Flow Manager 320 returns to reassess the flow assignments based upon this resource availability information. If an appropriate number of slave BBSRs are available, the master BBSR assigns the scheduled flows to the slave BBSRs. For example, the master BBSR may assign an address (e.g., an IP address) via the backhaul connection 318 to a particular slave BBSR to associated the slave with a flow. Operations of the Flow Manager 320 may also include providing 410 the multicast controller with data that identifies each slave BBSR and associates the slave with an assigned flow. Correspondingly, this information may be provided (e.g., by the multicast controller) to a content server for directing the assigned flow to the proper slave BBSR.

Referring to FIG. 3, in the previous example, the multicast controller (e.g., BCMCS controller 306) communicated with the master BBSR 302 and was unaware of the slave BBSRs 310-316. However, in other implementations the multicast controller may be aware of all or a portion of the slave BBSRs. For example, the multicast controller may send information to each of the slave BBSRs (along with the master BBSR) that identifies each flow. To provide this information, the multicast controller is provided addresses (e.g., IP addresses) or other identifying information assigned to each of the BBSRs. By implementing this methodology, the master BBSR 302 can assign flow processing to particular slave BBSRs without assigning addresses to the slaves. Parameter negotiations would typically fall under the responsibility of the master BBSR 302, however, one or more slaves may assist or be delegated the negotiation task. Additionally, since the multicast controller recognizes each of the BBSRs, one or the slaves could assume the duties of the master BBSR (if the master malfunctions).

Along with negotiating flow parameters, the master BBSR assigns flow to the slave BBSRs. For example, upon determining a particular slave BBSR is available to process a flow, the master BBSR 302 sends a message alerting the slave to its selection to prepare to process a multicast flow. As described below, various methodologies may be utilized to assign an appropriate slave BBSR to a particular flow. In some arrangements, the slave BBSR may send an acknowledge message back to the master BBSR 302 over the backhaul connection 318.

In addition to assigning slave BBSRs to multicast flows, the master BBSR 302 may also change flow assignments among the slave BBSRs. For example, to provide a more balanced flow distribution, the master BBSR 302 may determine to switch a multicast flow from being processed by the slave BBSR 310 to the slave BBSR 312. At a later time, the master BBSR 302 may determine it advantageous to switch the processing of the flow back to the slave BBSR 310 and may or may not assign additional flow processing to the slave BBSR 312.

One or more techniques may be used by Flow Manager 320 to balance the multicast flow processing provided by the BBSRs. For example, each BBSR (e.g., the master BBSR and the slave BBSRs) may be considered to have a predefined processing rate (e.g., quantified in kilo bits per second (kbps)) or other associated metric (e.g., bandwidth, capacity, etc.) for processing flows. Data that represents the processing rate of each slave BBSR may be provided to the master BBSR 302 so that the master may track the amount of processing being consumed by each slave as flows are assigned. As the consumed rate approaches the predefined maximum threshold, the master BBSR 302 may assign fewer flows to that particular slave BBSR until the processing rate consumption decreases (e.g., as flow processing is completed).

Another technique implemented by Flow Manager 320 may dynamically monitor the processing load of each slave BBSR 310-316 along with the master BBSR 302 to determine availability. For example, each slave BBSR may periodically (e.g., every 30 seconds, 30 minutes, etc.) provide data over the backhaul connection 318 to the master BBSR 302 that represents the current processing capacity being consumed by the slave BBSR. Rather than periodic delivery of this data, the processing usage data may also be delivered based upon a particular event. For example, the master BBSR 302 may send a request message to each slave BBSR 310-316 to trigger a status message being sent from each slave over the backhaul connection 318 to the master BBSR. These status messages may include data that represents the current processing capacity being consumed by each respective slave BBSR. Detecting particular events may also trigger the slave BBSRs 310-316 to send status messages to the master BBSR 302. For example, a dramatic increase in flow traffic may be detected and trigger the sending of a status message to the master BBSR 302.

Along with passing information between the master BBSR and the slave BBSRs, data may also be passed between other system components. For example, unicast flows may be individually sent to the BBSRs or in combination with multicast flows for transmission. Similar to multicast processing, to process unicast flows the master BBSR 302 may provide the BCMCS controller 306 one or more addresses respectively assigned to the slave BBSRs to process the unicast flow. The address or addresses may also be provided to a content server (e.g., content server 308) as an alert as to which slave BBSR is responsible for each unicast flow.

Various types of information may be passed among the BBSRs such as Generic Routing Encapsulation (GRE) data (e.g., keys) being passed from the master BBSR 302 to one or more slave BBSRs 310-316 and the content server 308. Along with sending messages to among themselves, the master BBSR 302 and the slave BBSRs 310-316 may send messages to other system components. For example, to join a flow each BBSR may send a message to the network 304 to identify itself to the content server 308. These messages may comply with multicast protocols such as the Internet Group Management Protocol (IGMP) such that the BBSR is identified for joining a unicast or multicast flow that is provided by the content server 308.

The master BBSR 302 may also perform other operations along with flow processing assignment. For example, the master BBSR 302 may map flows being produced into a common channel (referred to as a logical channel). Along with mapping a single flow (e.g., a unicast flow or multicast flow) in a single logical channel, multiple flows may be mapped into a logical channel. Various mapping techniques (e.g., Reed Solomon) may be implemented to produce one or more logical channels.

To combine multiple flow into a single logical channel, techniques such as time division multiplexing may be incorporated by the master BBSR 302. For a finite number of time slots (e.g., 256), the master BBSR 302 may allocate the slots among the flows being placed on the channel. For example, alternating time slots may allow two unicast flows to be interleaved while still providing proper bandwidth. However, multicast flows may need additional bandwidth in order to for interleaving into a channel. By assigning a series of consecutive time slots (e.g., three slots, four slots, etc.) for each interleave period, the bandwidth constraints may be met for a multicast flow. As such, the logical channel contains an interleave of time slot groups are that each assigned to a multicast flow. The master BBSR 302 may also reallocate the time slots along with the flow included in the logical channels. Additionally, the logical channels may be assigned to broadcast channels to satisfy the bandwidth requirements of the logical channels. The master BBSR 302 may also assign a flow rate to each of the slave BBSRs, for example, a rate of approximately one hundred bits per second or higher may be assigned.

Along with controlling the RNC functionality of itself, a BBSR (e.g., the master BBSR 302) may remotely control the same functionally of another BBSR (e.g., the slave BBSRs). As such the master BBSR 302 may be used to control the RN functionality of one or more of the slave BBSRs 310-316. Thus one BBSR may instruct one or more other BBSRs to open, close or modify logical channels. Additionally, the controlling BBSR may initiate the transmission of messages from one or more other BBSRs (along with itself). For example, a message (e.g., a broadcast overhead message) may be sent that conveys information such as identifying when a flow is available in a particular sector, a map that identifies flow interlacing within a logical channel, time slot information or other configuration information. Typically, the broadcast overhead message (BOM) is provided to each of the slave BBSRs 310-316 from the master BBSR 302 via the overhaul connection 318. The message is then broadcast by the BBSRs to the ATs in their respective sectors.

Figure 5:
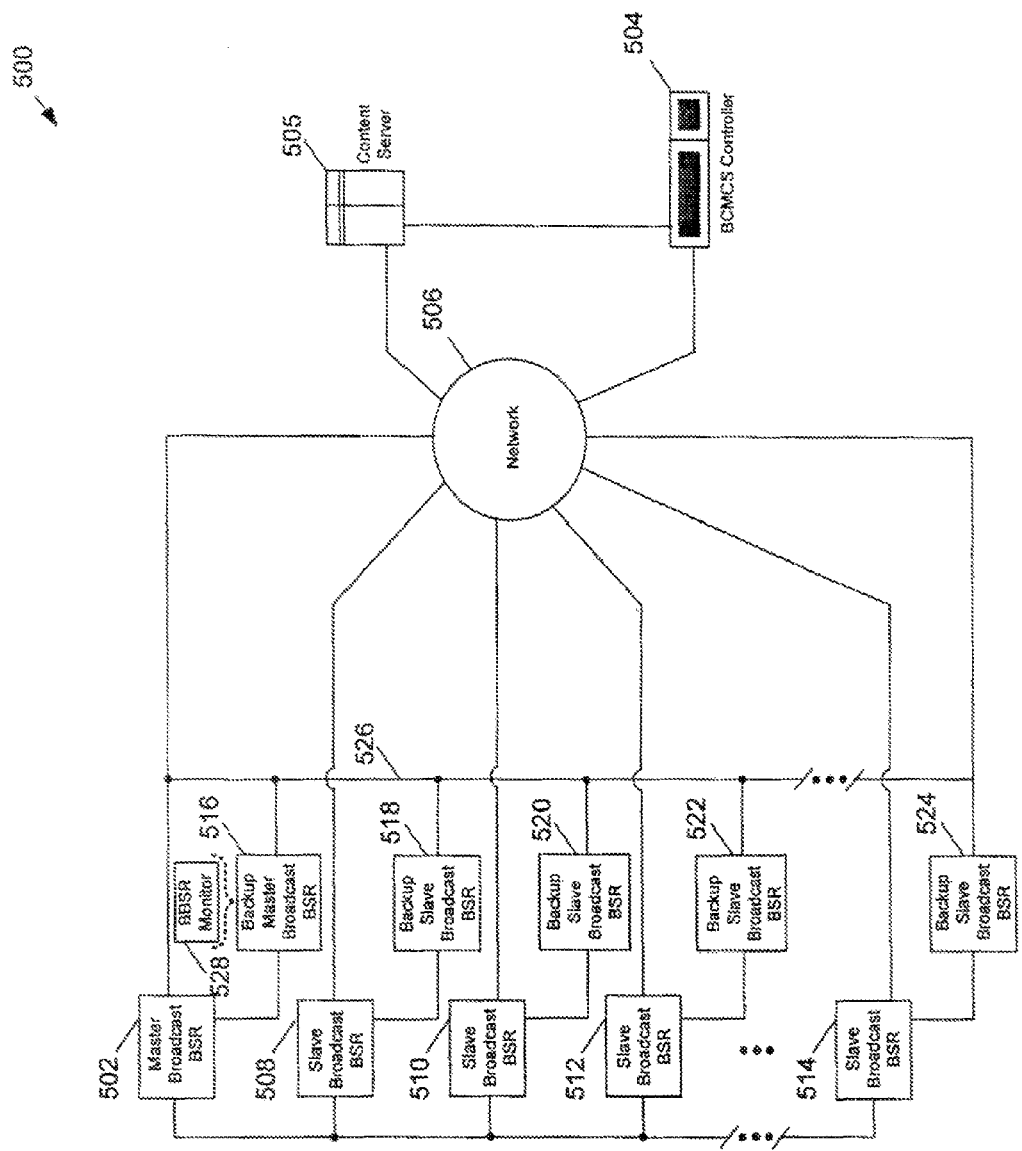
FIG. 5 is a block diagram of a Master Broadcast Base Station Router, Slave Broadcast Base Station Routers and backup Broadcast Base Station Routers.

Referring to FIG. 5, along with distributing the multicast flows among BBSRs to reduce process loading, redundant BBSRs may be incorporated to reduce the effects of BBSR malfunction and failure. In this exemplary system 500, a master BBSR 502 is connected to a BCMCS controller 504 (and a content server 505) via a network 506 and to a series of slave BBSRs 508, 510, 512, 514 in a manner similar to the system 300 shown in FIG. 3. To provide a backup capability, a dedicated backup BBSR is connected to each BBSR. In particular a backup master BBSR 516 is connected to the master BBSR 502. Similarly, backup slave BBSRs 518, 520, 522 and 524 are respectively connected to slave BBSRs 508, 510, 512 and 514. While each BBSR is connected to a dedicated backup BBSR, in some arrangements a backup BBSR may be shared among two or more primary BBSRs.

Each backup BBSR monitors the functionality (e.g., operation execution, processing capacity, etc.) of the BBSR to which it is connected. For example, backup master BBSR 516 monitors the functionality of the master BBSR 502 while backup slave BBSR 518 monitors the functionality of the slave BBSR 508. To monitor BBSR functionality, one or more techniques may be implemented. For example, a backup BBSR may send a status request signal (referred to as a heartbeat signal) to a corresponding BBSR at designated time intervals (e.g., 30 seconds, 30 minutes, etc.). If an acknowledgement signal is sent back to the backup BBSR from the BBSR being monitored, the functionality of the BBSR is considered to be proper. If the acknowledgement signal is not received, or is not received in a resonable time period, the monitored BBSR is considered to have failed and the backup BBSR assumes the processing load of the failed BBSR.

Along with assuming the responsibility of the failed BBSR, the backup BBSR may also perform other operations such as alerting other system components to the backup BBSR assuming responsibility. For example, upon assuming the responsibility of the master BBSR 502, the backup master BBSR 516 sends a message to the BCMCS controller 504 to assert that it is now operating as the master BBSR. The backup master BBSR 516 also sends a message to the slave BBSRs 508-514 and the other backup BBSRs 518-524. To provide this signaling, a connection 526 allows each backup BBSR 516-524 to communication with each system component.

Absence of a signal being sent may also indicate that a backup BBSR needs to assume the operational responsibility of an associated BBSR. For example, the master BBSR 502 typically sends an acknowledgement signal to the BCMCS controller 504 for each instance of a multicast flow being set up with a slave BBSR (based on receiving a setup acknowledgement signal from the slave BBSR). However, if the BCMCS controller 504 does not receive the acknowledgement signal from the master BBSR 502, the controller assumes that the master BBSR has failed and resends the multicast information to the backup master BBSR 516 (to assure that the multicast flow(s) is properly assigned to the slave BBSR). Thereby, assuming a failure has occurred based upon the absence of the acknowledge signal, the probability that multicast information is not processed or disseminated to the slave BBSRs is reduced.

In this arrangement, the backup master BBSR 516 serves as a dedicated backup to the master BBSR 502, however, other more distributed methodologies may be implemented. For example, upon determining that a BBSR is inoperable or has failed, the backup BBSRS may collectively identify which backup should assume responsibility. Based upon a vote or a group decision (based on current processing capacity), an appropriate backup BBSRs may be identified. Additionally, the backup assignments may be dynamically altered based on current and scheduled processing needs.

To monitor the functionality of a BBSR, a BBSR monitor 528 is executed by a corresponding backup BBSR (e.g., the backup master BBSR 516). Similar to the Flow Manager 320, the BBSR Monitor 528 may be provided by one or more processors (e.g., general processors, specialized devices, etc.) executing instructions to perform operations. The processors may be implemented as a monolithic structure or in a distributed structure. The instructions may reside in a memory (e.g., random access memory (RAM), read-only memory (ROM), static RAM (SRAM), etc.) and be stored on one or more mass storage devices (e.g., magnetic, magneto-optical disks, or optical disks, etc.).

Figure 6:
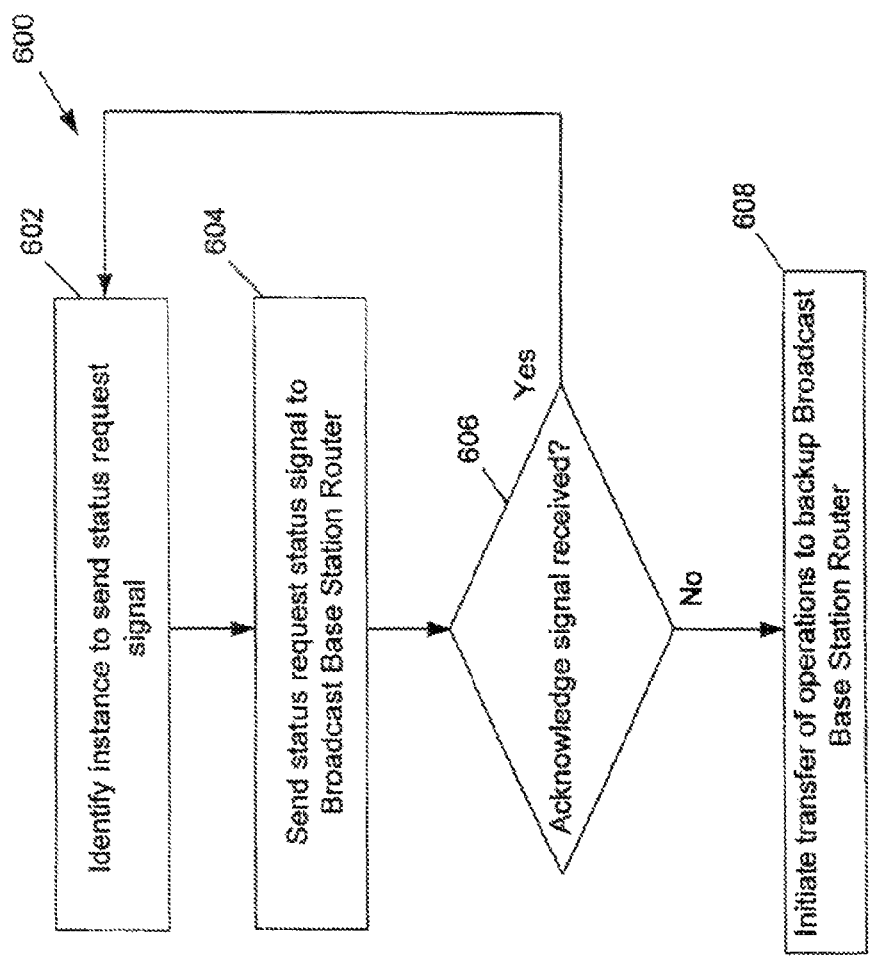
FIG. 6 is a flow chart of operations executed by a Broadcast Base Station Router Monitor.

Referring to FIG. 6, a flowchart 600 that represents some of the operations of the BBSR Monitor 528 is shown. As mentioned, the BBSR Monitor 528 may be executed by a backup BBSR such as the backup master BBSR 516 or any of the other backup BBSRs 518-524. Some of the operations of the BBSR Monitor 528 may include identifying 602 an instance in which a status request signal is to be sent to the BBSR being monitored. For example, a status request signal may be periodically sent at predetermined time intervals (e.g., 30 seconds, 30 minutes, etc.). A status request signal may also be sent if a particular event is detected such as a substantial change in flow traffic or the BBSR under monitor issues an alert that it has malfunctioned or failed.

Some operations also include sending 604 a status request signal to the BBSR being monitored. Typically, upon receiving the status request signal, a properly functioning BBSR returns an acknowledgement signal to the backup BBSR. If the BBSR being monitored is malfunctioning or has failed, the acknowledgement signal may not be sent. If an acknowledgement signal is not received, or not received within a predefined time period, for example, the BBSR being monitored is considered to be malfunctioning or to have failed. Thereby, operations also include determining 606 if an acknowledgement signal has been properly received. If an acknowledgement signal is received, the BBSR Monitor 528 returns to identify the next instance in which to send another status request signal. If an acknowledgement signal is not received, the BBSR Monitor 528 initiates transferring 608 the operations of the BBSR under monitor to the appropriate backup BBSR.

In some embodiments one or more processors may execute instructions to perform the operations of the BBSR Monitor 528, e.g., represented in flowchart 600. For example, one or more general processors (e.g., a microprocessor) and/or one or more specialized devices (e.g., an application specific integrated circuit (ASIC), etc.) may execute instructions. One or more of the processors may be implemented in a single integrated circuit as a monolithic structure or in a distributed structure. In some embodiments the instructions that are executed by the processors may reside in a memory (e.g., random access memory (RAM), read-only memory (ROM), static RAM (SRAM), etc.). The instructions may also be stored on one or more mass storage devices (e.g., magnetic, magneto-optical disks, or optical disks, etc.)

One or more of the operations associated with the BBSR Monitor 528 may be performed by one or more programmable processors (e.g., a microprocessor, an ASCI, etc.) executing a computer program. The execution of one or more computer programs may include operating on input data (e.g., data provided from a source external to the RAN, etc.) and generating output (e.g., sending data to a destination external to the RAN, etc.). The operations may also be performed by a processor implemented as special purpose logic circuitry (e.g., an FPGA (field programmable gate array), an ASIC (application-specific integrated circuit), etc.).

Operation execution may also be executed by digital electronic circuitry, or in computer hardware, firmware, software, or in combinations of them. The operations described in flowchart 600 (along with other operations of the Flow Manager 320) may be implemented as a computer program product, e.g., a computer program tangibly embodied, e.g., in a machine-readable storage device (e.g., RAM, ROM, harddrive, CD-ROM, etc.). The computer program product may be executed by or control the operation of, data processing apparatus, e.g., a programmable processor, a computer, or multiple computers. A computer program may be written in one or more forms of programming languages, including compiled or interpreted languages, and it can be deployed in any form, including as a stand-alone program or as a module, component, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network.

Although the techniques have been described with respect to a RAN that supports the 1×EV-DO family of standards, the techniques are also applicable to other standards such as the Universal Mobile Telecommunications Systems (UMTS) standard.

Other embodiments are within the scope of the following claims.

What is claimed is:

1. A method comprising:
in response to being informed by a controller of a flow for transmission to at least one access terminal in a wireless network, a master base station router, assigning the flow to one of a plurality of slave base station routers to process the flow for transmission to the access terminal absent the flow being provided to the master base station router, wherein the assigned slave base station router operates as a radio node controller and assigning the flow includes the master base station router negotiating flow parameters with the controller, and
in response to a monitoring message being sent to the master base station router from a backup base station router, transferring flow operations from the master base station router to the backup base station router, wherein in transferring flow operations is based, at least in part, upon the absence of a message acknowledgement response being sent from the master base station router.

2. The method of claim 1 wherein the controller is unaware of the plurality of slave base station routers.

3. The method of claim 1 wherein a content server provides the flow to the assigned slave base station router.

4. The method of claim 1 wherein assigning the flow includes the master base station router determining the processing capacity of each of the plurality of slave base station routers.

5. The method of claim 1 wherein assigning the flow includes each of the plurality of slave base station routers providing their respective processing capacity to the master base station router.

6. The method of claim 5 wherein each of the plurality of slave base station routers periodically provide their respective processing capacity to the master base station router.

7. The method of claim 5 wherein an event triggers the providing of the processing capacity from each of the plurality of slave base station routers.

8. The method of claim 7 wherein the event includes exceeding a processing capacity threshold.

9. The method of claim 1 wherein the controller is aware of the plurality of slave base station routers.

10. The method of claim 1, further comprising:
sending a message from the backup base station router to each of the plurality of slave base station routers as a flow operations transfer alert.

11. The method of claim 10 wherein the message indicates the transfer of operations from the master base station router to the backup base station router.

12. The method of claim 1 further comprising:
in response to detecting a failure of one of the plurality of slave base station routers, transferring flow operations from the slave base station router to a backup base station router.

13. The method of claim 1 wherein the flow comprises a multicast flow.

14. The method of claim 1 wherein the flow comprises a unicast flow.

15. The method of claim 1 wherein the flow conforms to a published standard.

16. The method of claim 1 wherein the flow comprises a Broadcast and Multicast Services (BCMCS) flow.

17. The method of claim 1 wherein the master base station router operates as a radio node.

18. The method of claim 1 wherein the master base station router operates as a radio node controller.

19. The method of claim 1 wherein the master base station router operates as a packet data serving node.

20. A system comprising:
a controller to initiate transmission of a flow to at least one access terminal in a wireless network,
a master base station router to assign processing of the flow and negotiate flow parameters with the controller,
a plurality of slave base station routers, wherein at least one of the plurality of slave base station routers is assigned by the master base station router to process the flow for transmission to the access terminal absent the flow being provided to the master base station and the assigned slave base station router operates as a radio node controller, and
a backup base station router to send a monitoring message to the master base station router and capable of assuming flow operations from the master base station router, wherein in response to a monitoring message being sent to the master base station router from the backup base station router, flow operations are transferred from the master base station router to the backup base station router absent a message acknowledgement response from the master base station router.

21. The system of claim 20 wherein the controller is unaware of the plurality of slave base station routers.

22. The system of claim 20 further comprising:
a content server to provide the flow to the assigned slave base-station router.

23. The system of claim 20 wherein the assignment by the master base station router is based upon, at least in part, the processing capacity of each of the plurality of slave base station routers.

24. The system of claim 23 wherein each of the slave base station routers provides their respective processing capacity to the master base station router.

25. The system of claim 23 wherein each of the slave base station routers periodically provides their respective processing capacity to the master base station router.

26. The system of claim 23 wherein an event triggers the providing of the processing capacity for each of the plurality of slave base station routers.

27. The system of claim 23 wherein the controller is aware of the plurality of slave base station routers.

28. The system of claim 20 wherein the backup base station router sends a message to each of the plurality of slave base station routers as a flow operations transfer alert.

29. The system of claim 28 wherein the message indicates the transfer of operations from the master base station router to the backup base station router.

30. The system of claim 20 wherein detecting a failure of one of the plurality of slave base station routers, flow operations are transferred from the slave base station router to a backup base station router.

31. The system of claim 20 wherein the flow comprises a multicast flow.

32. The system of claim 20 wherein the flow comprises a unicast flow.

33. The system of claim 20 wherein the flow conforms to a published standard.

34. The system of claim 20 wherein the flow comprises a Broadcast and Multicast Services (BCMCS) flow.

35. The system of claim 20 wherein the master base station router operates as a radio node.

36. The system of claim 20 wherein the master base station router operates as a radio node controller.

37. The system of claim 20 wherein the master base station router operates as a packet data serving node.

38. A computer readable storage device medium bearing instructions to cause a machine to:
in response to being informed by a controller of a flow for transmission to at least one access terminal in a wireless network, a master base station router, assign the flow to one of a plurality of slave base station routers to process the flow for transmission to the access terminal absent the flow being provided to the master base station router, wherein the assigned slave base station router operates as a radio node controller and assigning the flow includes the master base station router negotiating flow parameters with the controller, and
in response to a monitoring message being sent to the master base station router from a backup base station router, transfer flow operations from the master base station router to the backup base station router absent a message acknowledgement response being sent from the master base station router.

39. The medium of claim 38 wherein the controller is unaware of the plurality of slave base station routers.

40. The medium of claim 38 wherein a content server provides the flow to the assigned slave base station router.

41. The medium of claim 38 wherein assigning the flow includes the master base station router determining the processing capacity of each of the plurality of slave base station routers.

42. The medium of claim 38 wherein assigning the flow includes each of the plurality of slave base station routers providing their processing capacity to the master base station router.

43. The medium of claim 42 wherein each of the plurality of slave base station routers periodically provide their respective processing capacity to the master base station router.

44. The medium of claim 42 wherein an event triggers the providing of the processing capacity from each of the plurality of slave base station routers.

45. The medium of claim 44 wherein the event includes exceeding a processing capacity threshold.

46. The medium of claim 38 wherein the controller is aware of the plurality of slave base station routers.

47. The medium of claim 38 further comprising instructions to cause the machine to:
in response to a monitoring message being sent to the master base station router from a backup base station router, transfer flow operations from the master base station router to the backup base station router.

48. The medium of claim 38 further comprising instructions to cause the machine to:
send a message from the backup base station router to each of the plurality of slave base station routers as a flow operations transfer alert.

49. The medium of claim 48 wherein the message indicates the transfer of operations from the master base station router to the backup base station router.

50. The medium of claim 38 further comprising instructions to cause the machine to:
in response to detecting a failure of one of the plurality of slave base station routers, transfer flow operations assigned to the slave base station router to a backup base station router.

51. The medium of claim 38 wherein the flow comprises a multicast flow.

52. The medium of claim 38 wherein the flow comprises a unicast flow.

53. The medium of claim 38 wherein the flow conforms to a published standard.

54. The medium of claim 38 wherein the flow comprises a Broadcast and Multicast Services (BCMCS) flow.

55. The medium of claim 38 wherein the master base station router operates as a radio node.

56. The medium of claim 38 wherein the master base station router operates as a radio node controller.

57. The medium of claim 38 wherein the master base station router operates as a packet data serving node.

* * * * *

UNITED STATES PATENT AND TRADEMARK OFFICE
CERTIFICATE OF CORRECTION

| | | |
|---|---|---|
| PATENT NO. | : 8,023,439 B2 | Page 1 of 1 |
| APPLICATION NO. | : 11/561526 | |
| DATED | : September 20, 2011 | |
| INVENTOR(S) | : Roshan M. Rao | |

It is certified that error appears in the above-identified patent and that said Letters Patent is hereby corrected as shown below:

Column 13, Line 60, In Claim 22, delete "base-station" and insert -- base station --, therefor.

Column 14, Line 46, In Claim 38, delete "controller," and insert -- controller --, therefor.

Signed and Sealed this
Eighth Day of November, 2011

David J. Kappos
*Director of the United States Patent and Trademark Office*